Figure 1:
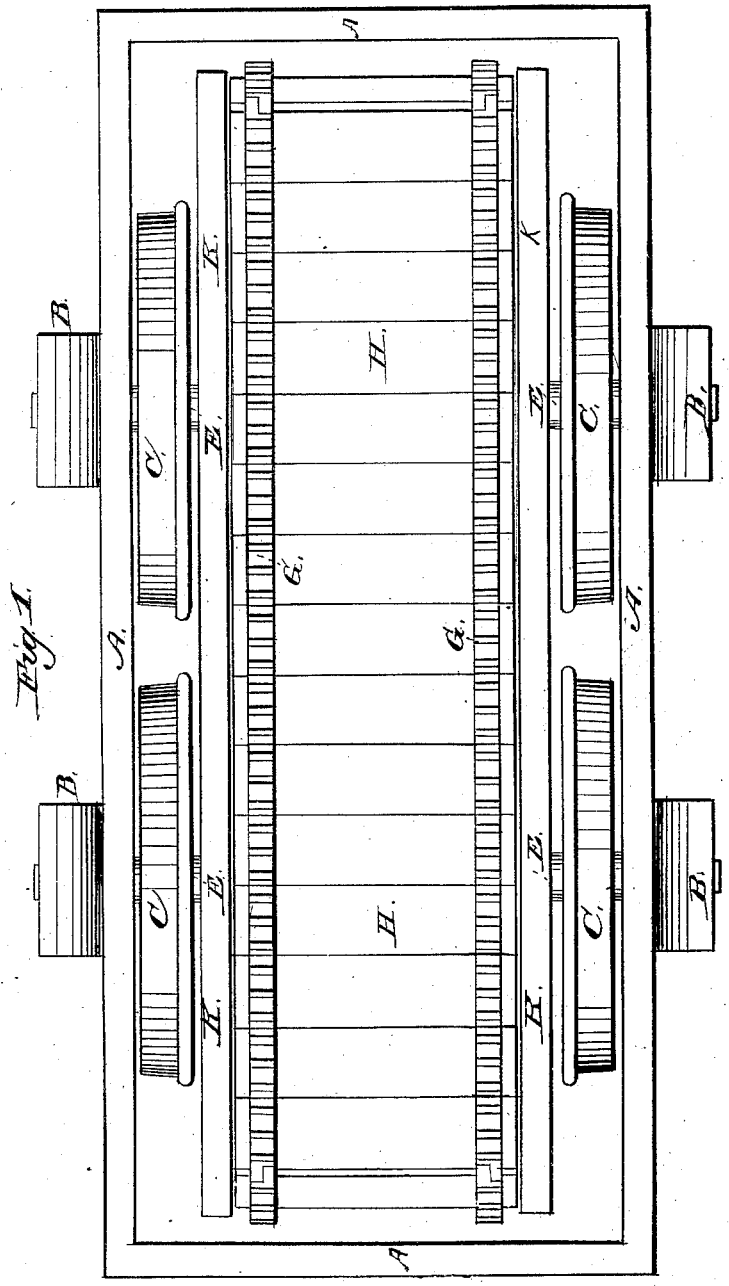

H. G. VANDERWERKEN.
PROPELLING CARS, &c.

No. 18,781. Patented Dec. 1, 1857.

2 Sheets—Sheet 2.
H. G. VANDERWERKEN.
PROPELLING CARS, &c.
No. 18,781. Patented Dec. 1, 1857.
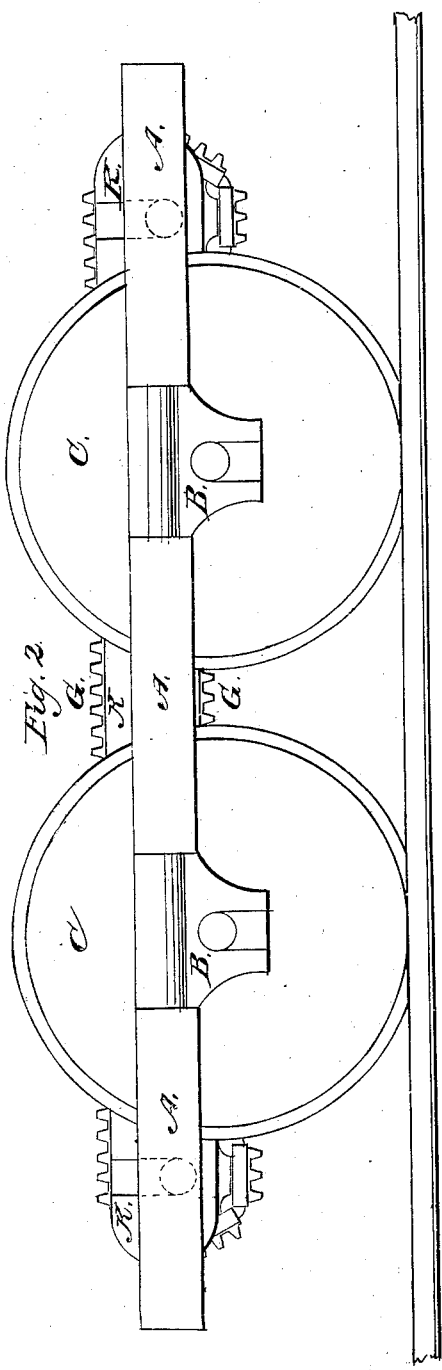
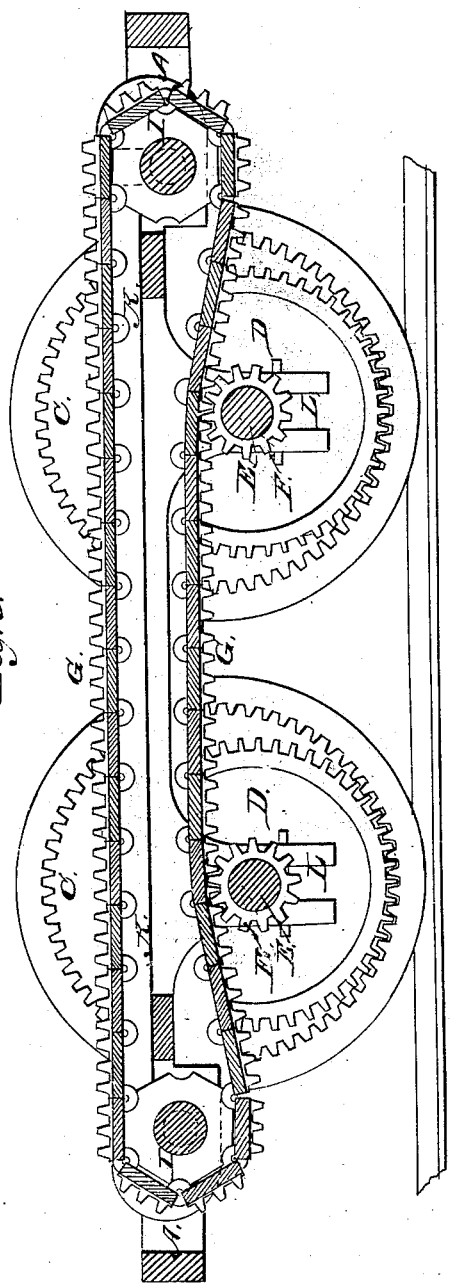

UNITED STATES PATENT OFFICE.

HENRY G. VANDERWERKEN, OF GREENBUSH, NEW YORK.

PROPELLING CARS AND CARRIAGES BY HORSE-POWER.

Specification of Letters Patent No. 18,781, dated December 1, 1857.

*To all whom it may concern:*

Be it known that I, HENRY G. VANDERWERKEN, of Greenbush, in Rensselaer county and State of New York, have invented certain new and useful Improvements in Propelling Cars and Carriages, and do hereby declare that the following is a full, clear, and exact description thereof, reference being had to the accompanying drawing, and to letters of reference marked thereon, forming part of this specification, and in which—

Figure 1 represents a plan of my machine. Fig. 2 is a side elevation, and Fig. 3 a vertical longitudinal section, taken through the center.

The same letters of reference occuring in the different figures, indicate corresponding parts.

The nature of my invention consists, first, in applying the propelling power uniformly and continuously to the upperside of the axle, thereby giving the greatest amount of leverage, without decreasing the velocity or effect produced; secondly, in hanging the endless chain platform in such a manner that when animal power is applied thereon it forms a self adjusting inclined plane, whichever way the animal's head is turned.

To enable others to understand, make and use my invention, I will describe its construction and operation, by referring to the drawing, in which, (A) represents a rectangular oblong frame, with journal boxes (B) to afford bearings for the axles of the wheels (C), which forms the draft carriage or drag; these wheels are all independent of each other, and are concave on their inner side, with cogs or gear teeth around the inner side of their rims; within the concave side of each of these wheels (C), are spur wheels (D) of somewhat smaller diameter, gearing into the internal teeth in the wheels (C); these spur wheels are permanently attached to the ends of the axles (E), on each of which are two pinions (F), suitably situated to gear into the racks (G) on either side of the endless chain platform (H). This platform is composed of a series of planks, side by side, linked or hinged together at each end, and passing around drums (I), at each end of the frame (K), thus forming an endless chain, the upper portion of which is supported, (between the drum (I)) on antifriction rollers at each end of the planks; attached to these planks, on their upper or outer surface, transversely at or near each end, are sections of a rack, which form also an endless rack on each side of the platform, and gear into the pinions (F) on the axles (E); on the underside of the frame (K) are four forks or yokes (L), which span the axles (E) between the pinions (F) and the wheels (D), and prevent it from moving endwise over them, while they admit of its raising or lowering at either end. This frame is also made somewhat shorter than the frame (A), to allow of its moving endwise within it, as the wheels D advance within the wheels (C), which will be hereinafter described. The weight of the platform and its burden is borne by the endless chain on the pinions (F), so that when the horse falls into the collar his main weight on the platform will be borne on his hind legs and will consequently cause it to assume an inclined position on the axles at either end, according to the position of the horse. By this arrangement and application of the endless chain platform to locomotion, it will be seen that the power is continuously applied to the axle directly above the center of the driving wheels, which is the point at which the greatest amount of leverage is obtained for propulsion, also that the endless track will remain level when the animal is at rest, which is the most natural position for him, and when at labor it assumes the inclined position, which is the most favorable for a full development of the muscular power while the weight of the horse on the platform descending the inclined plane is also made available for propulsion; and that when the driving wheels (D) are put in motion by the endless chain racks gearing into the pinions on their axles, their cogged peripheries traverse the interior gear of the endless or revolving track wheels (C), and in their effort to ascend the curved inclined plane of their interior contour, cause them to revolve by the application of both power and weight, depressing the rim of the wheel (C) or endless track, at a point not previously in contact with the permanent rail, thereby producing a rolling effect upon it, whereby the tendency of the wheel to slip upon the track is materially reduced.

Having thus described my invention, what I claim therein as new and desire to secure by Letters Patent, is—

1. So arranging the endless belt platform on a frame independent of the truck that the return part or underside of the belt may rest upon and gear into pinions on one or both axles and thus cause them to rotate in the direction in which the horse is apparently walking, without the use of any intermediate gearing, in the manner substantially as specified.

2. I claim supporting the endless belt platform on the axles of the truck in such manner that when the horse is at work it will assume an inclined position and when at rest a horizontal one, in the manner and for the purposes set forth.

In testimony whereof, I have hereunto subscribed my name this 18th day of October 1855.

H. G. VANDERWERKEN.

Witnesses:
A. GREGORY,
WM. M. SMITH.